United States Patent
Hodges et al.

(10) Patent No.: US 11,481,711 B2
(45) Date of Patent: Oct. 25, 2022

(54) SYSTEM AND METHOD FOR MODIFYING CAPACITY FOR NEW FACILITIES

(71) Applicant: Walmart Apollo, LLC, Bentonville, AR (US)

(72) Inventors: Timothy Ryan Hodges, Bentonville, AR (US); Christopher Wade Spencer, Garfield, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 159 days.

(21) Appl. No.: 16/428,599

(22) Filed: May 31, 2019

(65) Prior Publication Data

US 2019/0370709 A1 Dec. 5, 2019

Related U.S. Application Data (60) Provisional application No. 62/679,391, filed on Jun. 1, 2018.

(51) Int. Cl.
*G06Q 10/06* (2012.01)
*G06F 16/25* (2019.01)
*G06F 9/451* (2018.01)

(52) U.S. Cl.
CPC ......... *G06Q 10/0637* (2013.01); *G06F 9/451* (2018.02); *G06F 16/252* (2019.01)

(58) Field of Classification Search
CPC ............... G06Q 10/06315; G06Q 10/0637
See application file for complete search history.

(56) References Cited

U.S. PATENT DOCUMENTS

| | | | |
|---|---|---|---|
| 7,437,305 B1 | 10/2008 | Kantarjiev et al. | |
| 7,533,036 B2 | 5/2009 | Bamberg et al. | |
| 8,285,584 B2 * | 10/2012 | Fotteler | G06Q 10/0631 |
| | | | 705/7.35 |
| 8,571,915 B1 * | 10/2013 | Wong | G06Q 10/06 |
| | | | 705/7.26 |
| 8,650,100 B1 | 2/2014 | Miller | |
| 8,700,443 B1 | 4/2014 | Murray | |

(Continued)

FOREIGN PATENT DOCUMENTS

| | | |
|---|---|---|
| WO | 0125876 A2 | 4/2001 |
| WO | 2014164829 | 10/2014 |

(Continued)

OTHER PUBLICATIONS

Van Donselaaretal, Ordering Behavior in Retail Stores and Implications for Automated Replenishment, Management Science, May 2010, vol. 56, No. 5 (May 2010), pp. 766-784 (Year: 2010).*

(Continued)

*Primary Examiner* — Andre D Boyce
(74) *Attorney, Agent, or Firm* — Fitch, Even, Tabin & Flannery, LLP (57) ABSTRACT

Systems, methods, and machine readable media are provided for modifying capacity for new facilities. A user selects a retail facility for having a capacity modification and selects a new capacity for the retail facility. The user submits the request for the new capacity for the retail facility. The user confirms the request for a new capacity for the retail facility and forwards the request for a new capacity for the retail facility to a capacity scheduling tool to produce a revised capacity schedule for the retail facility.

20 Claims, 7 Drawing Sheets

(56) References Cited

U.S. PATENT DOCUMENTS

| | | | |
|---|---|---|---|
| 9,633,389 | B2 | 4/2017 | Carr et al. |
| 9,659,079 | B2 | 5/2017 | Vasantham et al. |
| 9,697,547 | B2 | 7/2017 | Borders |
| 9,805,402 | B1 | 10/2017 | Maurer |
| 10,482,421 | B1 * | 11/2019 | Ducrou ............. G06K 9/00671 |
| 10,719,799 | B1 * | 7/2020 | Harris ............. G06Q 10/06311 |
| 2002/0143655 | A1 | 10/2002 | Elston et al. |
| 2003/0177072 | A1 | 9/2003 | Bared |
| 2004/0107110 | A1 | 6/2004 | Gottlieb |
| 2005/0197949 | A1 * | 9/2005 | Welter ................... G06Q 40/04 705/37 |
| 2005/0216357 | A1 * | 9/2005 | Wittmer ............. G06Q 30/0603 705/26.1 |
| 2007/0187183 | A1 * | 8/2007 | Saigh ...................... E04H 14/00 186/53 |
| 2009/0063251 | A1 | 3/2009 | Rangarajan |
| 2011/0225023 | A1 | 9/2011 | Evens |
| 2011/0288895 | A1 | 11/2011 | Perez, Jr. |
| 2012/0022900 | A1 | 1/2012 | Thakkar |
| 2012/0078673 | A1 | 3/2012 | Koke |
| 2014/0279665 | A1 * | 9/2014 | Lievens .................. G06Q 30/02 705/339 |
| 2014/0330739 | A1 | 11/2014 | Falcone |
| 2014/0359092 | A1 | 12/2014 | Middleton |
| 2014/0372161 | A1 | 12/2014 | Ulrich |
| 2016/0063604 | A1 | 3/2016 | Shaffer et al. |
| 2016/0110735 | A1 * | 4/2016 | Brereton ............. G06Q 10/087 705/7.31 |
| 2016/0196524 | A1 | 7/2016 | Ito |
| 2017/0083967 | A1 * | 3/2017 | Shiely ................. G06Q 30/0641 |
| 2017/0103374 | A1 * | 4/2017 | Bhattacharjee ........ G06Q 20/32 |
| 2017/0193586 | A1 | 7/2017 | Yuan et al. |
| 2017/0270545 | A1 | 9/2017 | Montgomery, III |
| 2017/0323250 | A1 | 11/2017 | Lindbo et al. |
| 2018/0130015 | A1 * | 5/2018 | Jones ................... B67C 7/0053 |
| 2018/0134492 | A1 * | 5/2018 | Lert, Jr. ............. G06Q 30/0643 |
| 2018/0285793 | A1 * | 10/2018 | Li ...................... G06Q 10/0633 |
| 2019/0303863 | A1 | 10/2019 | Ghosh |
| 2019/0354920 | A1 * | 11/2019 | Farias .................. G06Q 10/087 |
| 2019/0369590 | A1 | 12/2019 | Hodges |

FOREIGN PATENT DOCUMENTS

| | | |
|---|---|---|
| WO | 2019232411 | 12/2019 |
| WO | 2019232434 | 12/2019 |

OTHER PUBLICATIONS

Agrawal et al., Multi-Vendor Sourcing in a Retail Supply Chain, Production and Operations Management, vol. 11 No. 2, Jun. 2002, pp. 157-182 (Year: 2002).*

Bühler, Dominic et al.; "Model-based delivery cost approximation in attended home services"; Computers & Industrial Engineering; Aug. 2016; vol. 98; Elsevier; <https://doi.org/10.1016/j.cie.2016.05.014>; 3 pages.

International Search Report and Written Opinion for PCT/US2019/34963 dated Aug. 20, 2019, pp. 1-12.

PCT; App. No. PCT/US2019/034963; International Preliminary Report on Patentability dated Dec. 10, 2020.

PCT; App. No. PCT/US2019/034993; International Preliminary Report on Patentability dated Dec. 1, 2020.

PCT; App. No. PCT/US2019/034993; International Search Report and Written Opinion dated Jul. 30, 2019.

USPTO; U.S. Appl. No. 16/428,590; Office Action dated Jan. 6, 2021.

Lee et al, Supply chain simulation with discrete-continuous combined modeling, Computers & Industrial Engineering 43 (2002) 375-392 (Year: 2002).

Patroklos Georgiadis et al, A system dynamics modeling framework for the strategic supply chain management of food chains, Journal of Food Engineering 70 (2005) 351-364 (Year: 2005).

USPTO; U.S. Appl. No. 16/428,590; Notice of Allowance dated Oct. 4, 2021; (pp. 1-9).

USPTO; U.S. Appl. No. 16/428,590; Office Action dated Jul. 7, 2021; (pp. 1-16).

* cited by examiner

| fulfillment_Type | day_of_week | start_Time | end_Time | old_Capacity | new_Capacity | status | programName |
|---|---|---|---|---|---|---|---|
| STORE | SAT | 800 | 900 | 0 | 8 | Implemented | GOCaRT |
| STORE | SAT | 900 | 1000 | 0 | 8 | Implemented | GOCaRT |
| STORE | SAT | 1000 | 1100 | 0 | 8 | Implemented | GOCaRT |
| STORE | SAT | 1100 | 1200 | 0 | 7 | Implemented | GOCaRT |
| STORE | SAT | 1200 | 1300 | 0 | 7 | Implemented | GOCaRT |
| STORE | SAT | 1300 | 1400 | 0 | 7 | Implemented | GOCaRT |
| STORE | SAT | 1400 | 1500 | 0 | 7 | Implemented | GOCaRT |
| STORE | SAT | 1500 | 1600 | 0 | 7 | Implemented | GOCaRT |
| STORE | SAT | 1600 | 1700 | 0 | 8 | Implemented | GOCaRT |
| STORE | SAT | 1700 | 1800 | 0 | 8 | Implemented | GOCaRT |
| STORE | SAT | 1800 | 1900 | 0 | 6 | Implemented | GOCaRT |
| STORE | SAT | 1900 | 2000 | 0 | 4 | Implemented | GOCaRT |

FIG. 6

SYSTEM AND METHOD FOR MODIFYING CAPACITY FOR NEW FACILITIES

CROSS-REFERENCE TO RELATED APPLICATIONS

This application claims priority to and benefit of U.S. Provisional Patent Application Ser. No. 62/679,391, filed on Jun. 1, 2018, the disclosure of which is incorporated herein by reference in its entirety.

BACKGROUND

Capacity management is an important aspect for a business, especially for a retail environment. Capacity can depend on staffing levels as well as physical and computing resources that are available. Efficient capacity management can help new retail facilities operate at peak levels.

SUMMARY

In accordance with embodiments of the present disclosure, a computer-implemented method for modifying capacity for a new retail facility is disclosed. The method includes generating a user interface through which a user selects a target retail facility for capacity modification, selects a new capacity for the retail facility, submits a request for the new capacity for the retail facility, and confirm the request for the new capacity for the retail facility; writing the new capacity to a database in the one or more computer-readable media in response to determining that the new capacity exceeds a specified threshold number of orders; forwarding the new capacity to a capacity scheduling tool to produce a revised capacity schedule; and interfacing with a webserver hosting a website to render the revised capacity schedule in the website. In accordance with embodiments, a non-transitory machine-readable medium storing instructions executable by a computing device is disclosed, wherein execution of the instructions causes the computing device to implement the above-recited method for modifying capacity for a new retail facility.

In accordance with embodiments of the present disclosure, a system for modifying capacity for a new retail facility is disclosed. The system includes one or more non-transitory computer-readable media, a first computing device, and a second computing device. The first computing device executes an application stored on the one or more computer-readable media to generate a user interface through which a user selects a target retail facility for capacity modification, selects a new capacity for the retail facility, submits a request for the new capacity for the retail facility, and confirm the request for the new capacity for the retail facility. The first computing device executes the application to write the new capacity to a database in the one or more computer-readable media in response to determining that the new capacity exceeds a specified threshold number of orders and forward the new capacity to a capacity scheduling tool to produce a revised capacity schedule. The second computing device is configured to interface with a webserver hosting a website to render the revised capacity schedule in the website.

In one embodiment, a computing device is configured to execute a capacity modification module for a new retail facility. The capacity modification module, when executed, enables a user to select a retail facility for having a capacity modification and select a new capacity for the retail facility. The capacity modification module further allows a user to submit the request for the new capacity for the retail facility and confirm the request for a new capacity for the retail facility. The capacity modification module additionally forwards the request for a new capacity for the retail facility to a capacity scheduling tool to produce a revised capacity schedule for the retail facility.

In another embodiment, a computer-implemented method for capacity modification for a new retail facility includes selecting a retail facility for having a capacity modification and selecting a new capacity for the retail facility. The method further includes submitting the request for the new capacity for the retail facility and confirming the request for a new capacity for the retail facility. The method also includes forwarding the request for a new capacity for the retail facility to a capacity scheduling tool to produce a revised capacity schedule for the retail facility.

In another embodiment, a non-transitory machine-readable medium stores instructions executable by a computing device, wherein execution of the instructions causes the computing device to implement a method for capacity modification for a new retail facility. The method includes selecting a retail facility for having a capacity modification and selecting a new capacity for the retail facility. The method further includes submitting the request for the new capacity for the retail facility and confirming the request for a new capacity for the retail facility. The method also includes forwarding the request for a new capacity for the retail facility to a capacity scheduling tool to produce a revised capacity schedule for the retail facility.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

Systems and methods of the present disclosure can be utilized to manage capacity in new facilities. Capacity can refer to staffing levels as well as physical capacity such as parking spaces, and physical and computing equipment. As a non-limiting example, a new facility may be able to handle 30 on-line grocery orders in a day, where the 30 orders are spread across several time slots within the day. Labor and staffing guidelines can be applied to data to confirm that the staffing can handle the demand of orders and scheduled pick-ups being processed by the facility. In certain situations, there may be a need to increase or decrease the capacity for a new facility quickly, while satisfying the guidelines.

By way of the presently disclosed systems and methods for capacity modification, a Market Coach can contemporaneously and dynamically increase or decrease capacities associated with one or more time slots in a day, instead of having to wait for weeks before capacity adjustments are implemented. This is especially important for new facilities where an increase in customer demand can be met quickly and any fear of losing a customer because or online orders not being available in a timely manner are minimized.

Figure 1:
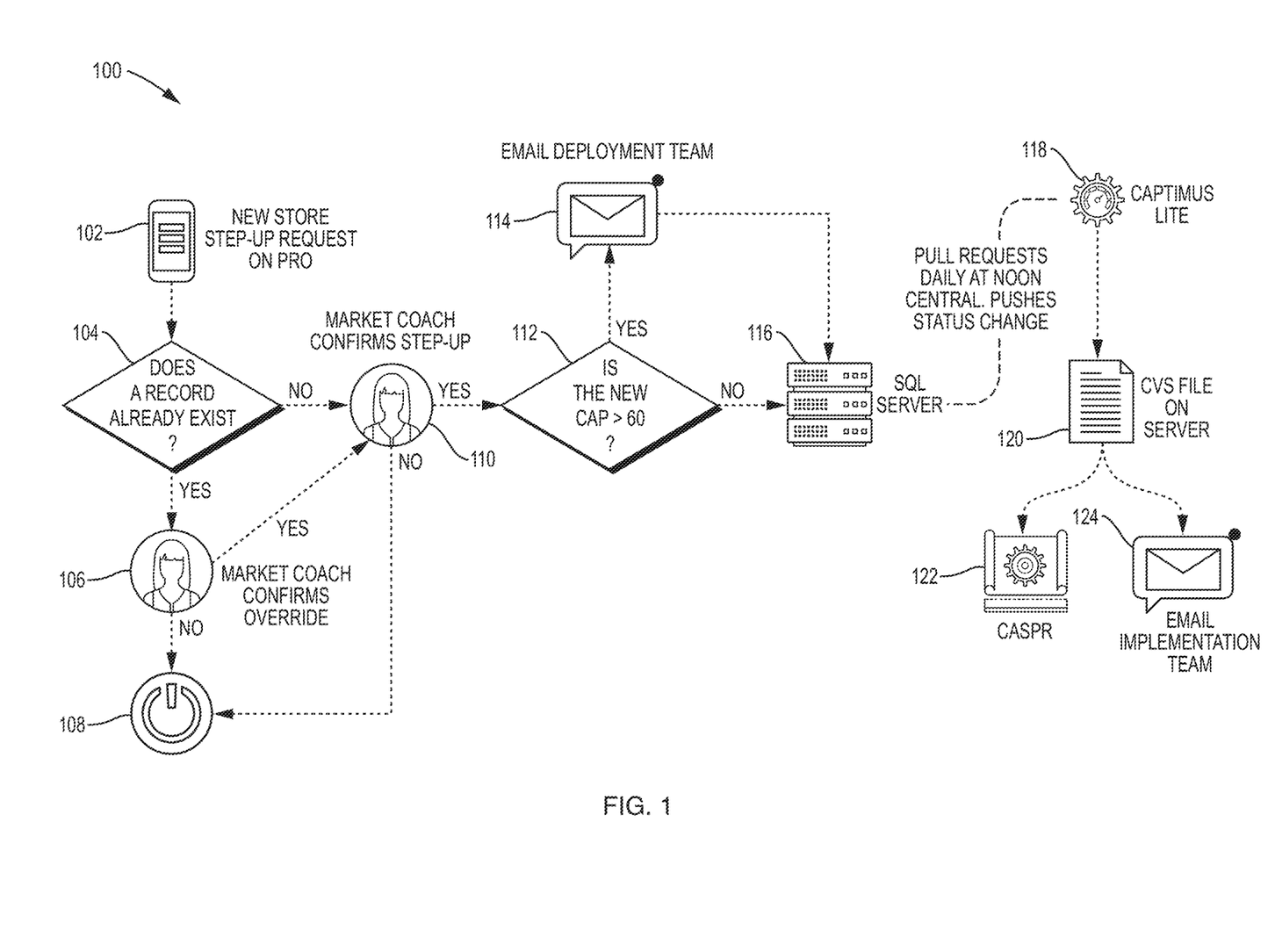
FIG. 1 is a block diagram of a system for implementing capacity modification for a new facility, according to an example embodiment.

Referring to FIG. 1 a system 100 is shown for providing capacity modification for a new facility. The system 100 can include one or more computing devices and one or more computer-readable medium configured to facilitate capacity modification. A step up request is submitted; via a user (e.g. a Market Coach) interacting with an application (a Grand Opening Capacity Request Tool (GOKaRT) 102) on a computing device, to one or more severs executing a capacity management tool. A retail facility can be considered a new retail facility if the retail facility has been open for less than a specified number of days or weeks, e.g., if the facility has been open for less than one week, two weeks, three weeks, one month or less date. A determination is made by the one or more servers at decision block 104 regarding whether a record for a requested capacity change already exists in response to receipt of the step-up request. If a request for a capacity change was previously made, the server(s) can interface with the application 102 to prompt the Market Coach for input and the Market Coach, via the application 102 executing on the computing device, can confirm or deny the override of the prior request by the new request (denoted by block 106). When the determination by the Market Coach is not to override the prior request, the server(s) cancel the latest request. When the override is confirmed, the new capacity request overrides the prior capacity request and the new capacity request is sent to the application by the server(s) for approval by the Market Coach. When the Market coach approves the request, the capacity can be increased or decreased by a specified amount. As a non-limiting example, the capacity can be increased or decreased by 30 orders. If the Market Coach does not approve the requested increase or decrease, the application notifies the server(s) and the server(s) cancel the request at block 108.

After the Market Coach confirms the requested increase or decrease capacity via the application, a determination is made at block 112 by the server(s) regarding whether the new capacity exceeds a specified threshold number of orders, e.g., whether the capacity exceeds 60 orders as a result of the approval of the capacity modification. An increase to a capacity greater than the specified threshold number of orders, e.g., 60 orders, can require additional equipment to process the orders, which may not be available for several days.

When the result is the final capacity would be greater than the specified threshold number of orders, an email or other mode of communication regarding this event (e.g., exceeding the specified threshold number of orders) is sent to a deployment team 114 by the server(s) so that additional equipment can be ordered. When the request for the new capacity is not greater than the specified threshold number of orders, e.g., 60 orders per day, the request is forwarded to an SQL database server 116 by the server(s). The requests are pulled daily from the SQL server and sent to a capacity optimization process (Captimus Lite) running on the server(s). The Captimus lite device 118 determines new capacities based on the requests and saves them on the server(s) denoted by reference numeral 120. This is in contrast to traditional capacity optimization tools, which use historical data collected over a specified period of time (e.g., four weeks) to update capacity values every two weeks. The output from the server at 120 is fed to a Computer Aided Scheduling and Planning of Resources, CASPR) system 122 and also emailed to an implementation team 124. The CASPR system 122 is a system which interfaces with the webserver hosting a retail facility website to provide the particular schedules for each retail facility. A user can place an online grocery order and select a pickup time for the order through the CASPR system. The information from CASPR is used to determine availability.

Figure 2A:
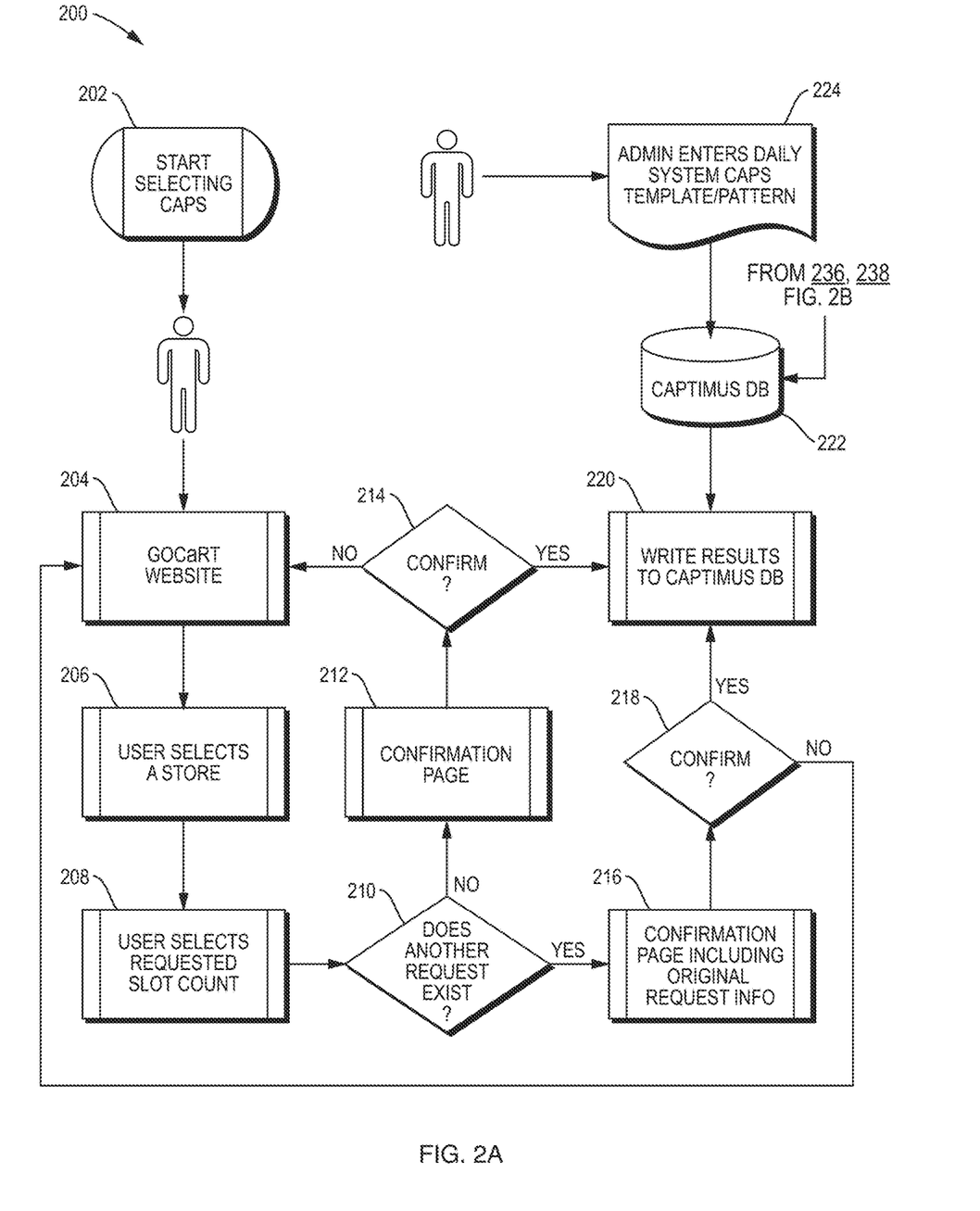
FIGS. 2A-2B are a flow diagram for a method of capacity modification for a new facility, according to an example embodiment.
Figure 2B:
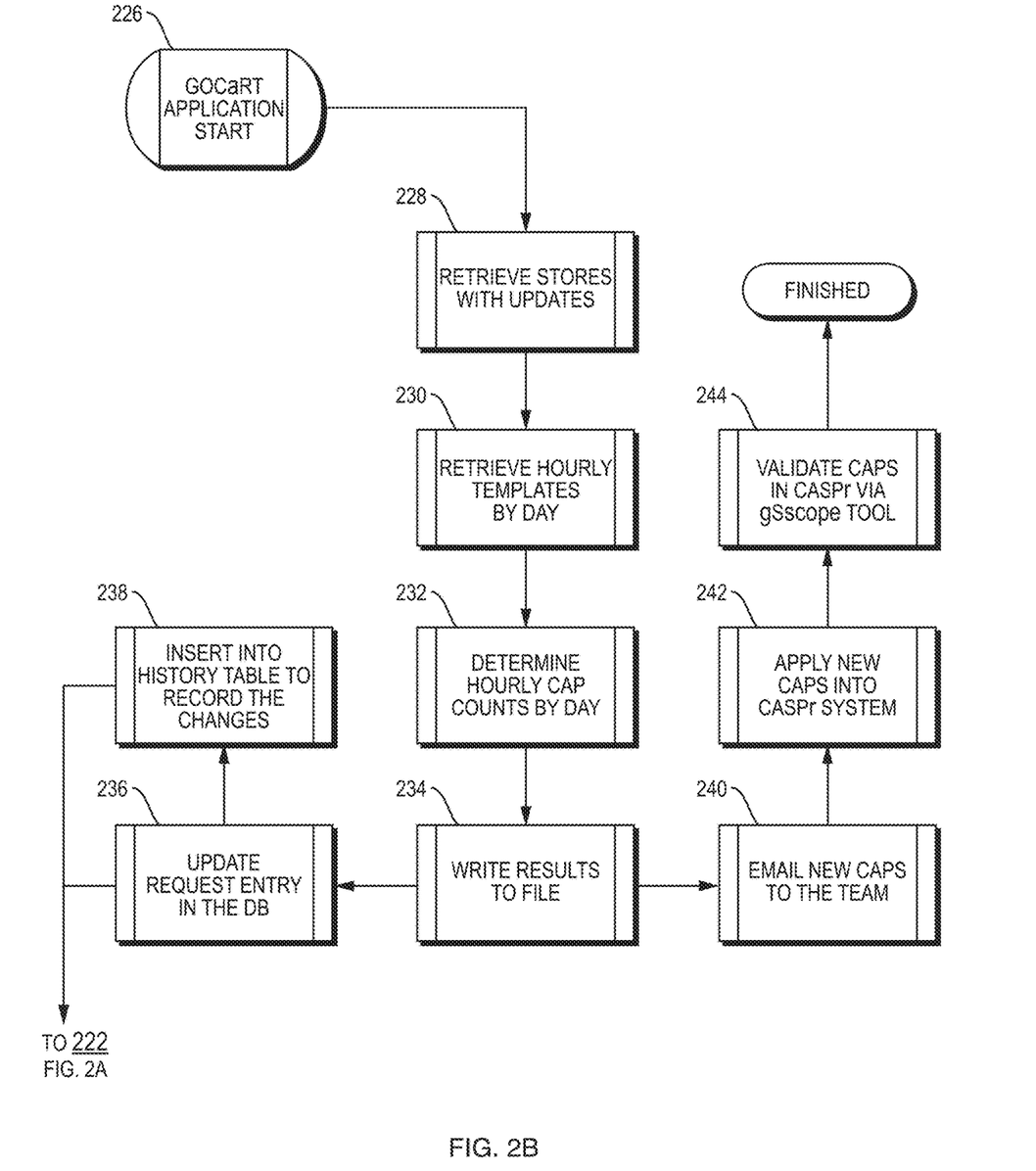

Referring now to FIGS. 2A-2B, a flow diagram of an example embodiment of a method 200 for modifying capacity for a new retail facility is shown. Method 200 begins with block 202 where a new capacity requests can be received via an application executing on a computing device. The requests can be for an increase in capacity or for a decrease in capacity. Block 204 shows a user interface, e.g., rendered by a website hosted by a webserver accessed by the application, which can be a web browser. The user interface can be used to receive requests for increases or decreases in capacity. At block 206, a selection of a particular retail facility is received in the user interface. The retail facility must be a new retail facility, meaning the retail facility has been open for less than a specified time period, e.g., less than two weeks, three weeks, and one month. At block 208, a selection of a requested capacity change is received via the user interface. At decision block 210, a determination is made by a server receiving the request regarding whether another request for a capacity change exists. When another request does not exist, processing continues with block 212 where a confirmation page is requested regarding the capacity increase or decrease. At decision block 214 a determination is made by the server as to whether the request is confirmed in response to an input form the user in the user interface. When the request is not confirmed, the web browser is directed back to the website 204. When the request is confirmed, the results are written to a database 220 by the server.

Referring back to decision block 210, when another request does exist, a confirmation page including the original request information is generated at block 216. A determination is made at decision block 218 by the server as to regarding whether the request is confirmed. When the request is confirmed the results are written to the database 220 by the server. When the result is not confirmed, the web browser is directed back to the website 204. As shown in block 224, the daily system capacities template/pattern 224 for the database 222 can be received from an Administrator.

A second part of the process for capacity modification for a new retail facility is shown in FIG. 2B, which begins with block 226 wherein the application (e.g., GOCaRT) is started on the same computing device or may be started on a different computing device. At block 228, retail facility data with updates is retrieved by the server. At block 230, hourly templates by day are retrieved. At block 232, an hourly capacity counts by day is determined by the server, and at block 234, the results are written to a file by the server. The update request entry is forwarded to the database as shown in block 236, and as shown in block 238, the changes are recorded in a history table. Both the update request entry and the history table are forwarded to the database 222.

Block 240 shows the new capacities are emailed to a team of user. At block 242, the new capacities are applied to the CASPR system by the server. The new entries in the CASPR system are validated at block 244 and the process is finished.

Figure 3:
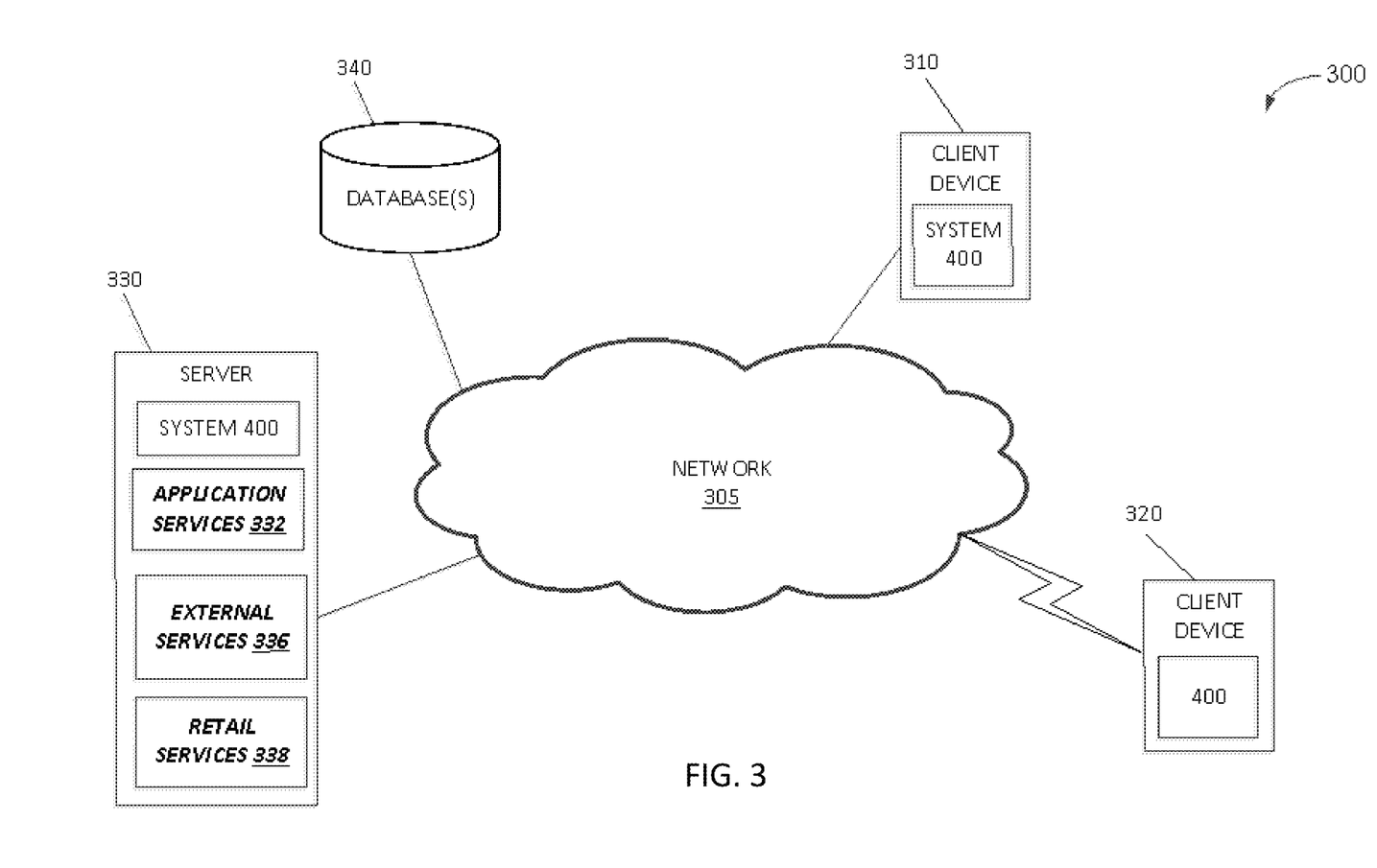
FIG. 3 is a diagram of an exemplary network environment suitable for implementing capacity modification for a new facility according to an exemplary embodiment.

FIG. 3 illustrates a network diagram depicting a system 300 for modifying capacity for a new retail facility, according to an example embodiment. The system 300 can include a network 305, multiple client devices, for example, client device 310, client device 320, a server 330, and database(s) 340. Each of the client devices 310, 320, server 330, and database(s) 340 is in communication with the network 305.

In an example embodiment, one or more portions of network 305 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 310, 320 may comprise, but are not limited to, mobile devices, hand-held devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of client devices 310, 320 may connect to network 305 via a wired or wireless connection. In an example embodiment, the client devices 310, 320 may perform one or more of the functionalities of the system 100 for modifying capacity for a new retail facility described herein, or transmit data or signals to the system 100 described herein. The client device 310, 320 can include one or more components of computing device 1200 of FIG. 4.

In an example embodiment, the system 300 for modifying capacity for a new retail facility may be included at least in part on the client device 310, 320, and the client device 310, 320 performs one or more of the functionalities of the system described herein. In an example embodiment, the system 100 may be included at least in part on the server 330, and the server 330 performs one or more of the functionalities of the system 100 described herein.

The database(s) 340 comprise one or more storage devices for storing data and/or instructions (or code) for use by the server 330 and/or the client devices 310, 320. Each of the database(s) 340 and the server 330 is connected to the network 305 via a wired connection. Alternatively, one or more of the database(s) 340 and server 330 may be connected to the network 305 via a wireless connection. The server 330 comprises one or more computers or processors configured to communicate with the client devices 310, 320 via network 305. The server 330 can include one or more components of device 400 of FIG. 4. Server 330 hosts one or more software systems, applications or websites, including one or more components of the system 100 described herein and/or facilitates access to the content of database(s) 340.

In an example embodiment, the server 330 also includes various software services that facilitate the functionalities of the system 100 for modifying capacity for a new retail facility. Database(s) 340 and server 330 may be located at one or more geographically distributed locations from each other or from client devices 310, 320. Alternatively, database(s) 340, 345 may be included within server 330.

Figure 4:
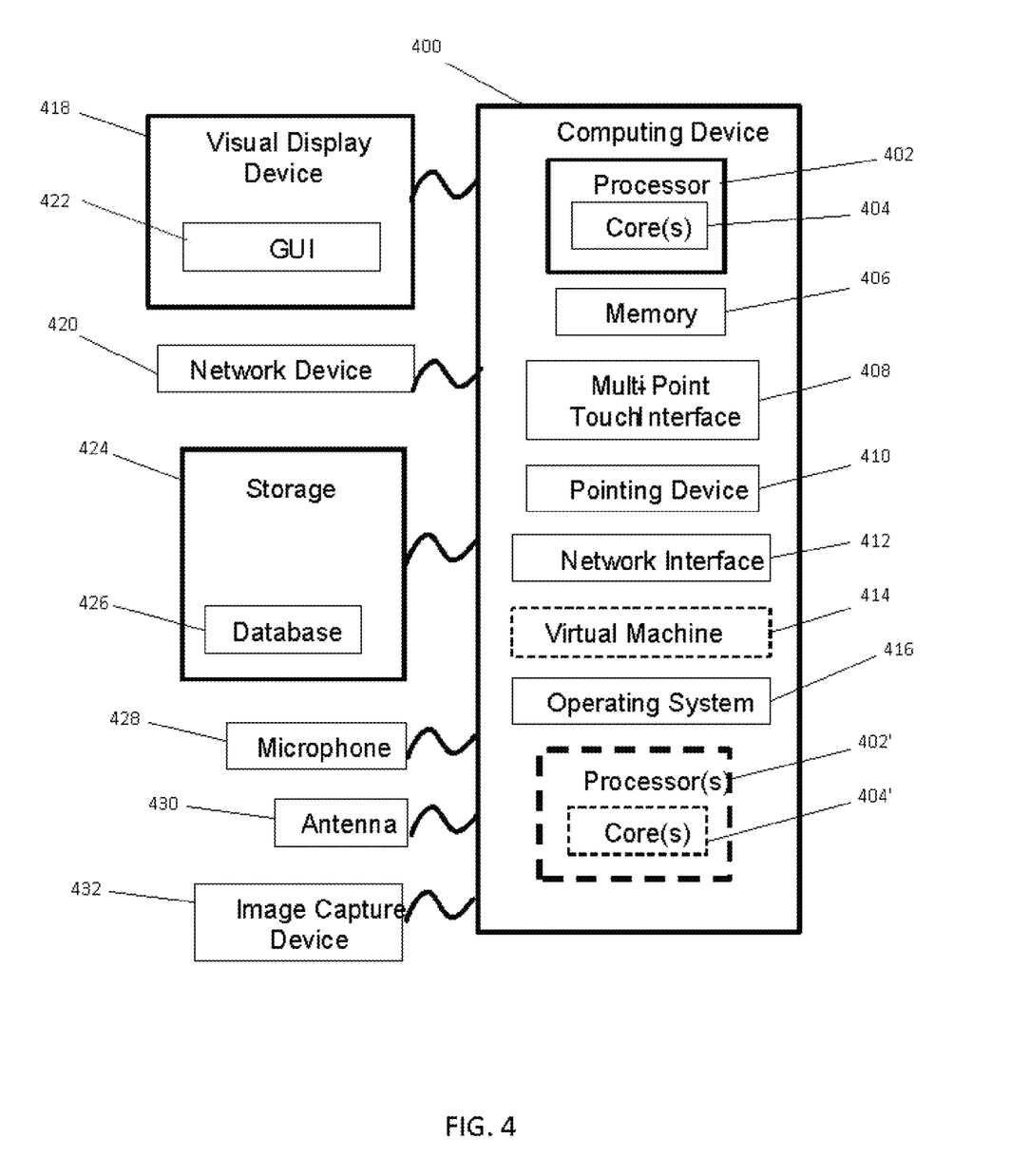
FIG. 4 is a block diagram of an exemplary computing device that may be used to implement exemplary embodiments described herein.

FIG. 4 is a block diagram of an exemplary computing device 400 that can be used to perform one or more steps of the methods provided by exemplary embodiments. For example, computing device 400 may be the client device 310, 320 and the server 330 as described in FIG. 3. The computing device 400 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 406 included in the computing device 400 can store computer-readable and computer-executable instructions or software for implementing exemplary embodiments. The computing device 400 also includes processor 402 and associated core 404, and optionally, one or more additional processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' can each be a single core processor or multiple core (404 and 404') processor.

Virtualization can be employed in the computing device 400 so that infrastructure and resources in the computing device can be shared dynamically. A virtual machine 414 can be provided to handle a process running on multiple processors so that the process appears to be using only one computing resource rather than multiple computing resources. Multiple virtual machines can also be used with one processor.

Memory 406 can include a computer system memory or random access memory, such as DRAM, SRAM, EDO RAM, and the like. Memory 406 can include other types of memory as well, or combinations thereof. An individual can interact with the computing device 400 through a visual display device 418, such as a touch screen display or computer monitor, which can display one or more graphical user interfaces 422 for receiving data from the individual (e.g., order data and travel data). The visual display device 418 can also display other aspects, elements and/or information or data associated with exemplary embodiments. The computing device 400 can include other I/O devices for receiving input from a individual, for example, a keyboard or another suitable multi-point touch interface 408, a pointing device 410 (e.g., a pen, stylus, mouse, or trackpad). The keyboard 408 and the pointing device 410 can be coupled to the visual display device 418. The computing device 400 can include other suitable conventional I/O peripherals.

The computing device 400 can also include one or more storage devices 424, such as a hard-drive, CD-ROM, or other computer readable media, for storing data and computer-readable instructions and/or software, such as one or more modules of the system 100 shown in FIG. 1 that implements exemplary embodiments of the system as described herein, or portions thereof, which can be executed to generate a graphical user interface 422 on display 418. Exemplary storage device 424 can also store one or more databases for storing suitable information required to implement exemplary embodiments. The databases can be updated by an individual or automatically at a suitable time to add, delete or update one or more items in the databases. Exemplary storage device 424 can store one or more databases 926 for storing provisioned data, and other data/ information used to implement exemplary embodiments of the systems and methods described herein.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or another device suitable for interfacing the computing device 400 to a type of network capable of communication and performing the operations described herein. Moreover, the computing device 400 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 400 can run an operating system 416, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 416 can be run in native mode or emulated mode. In an exemplary embodiment, the operating system 416 can be run on one or more cloud machine instances.

Figure 5:
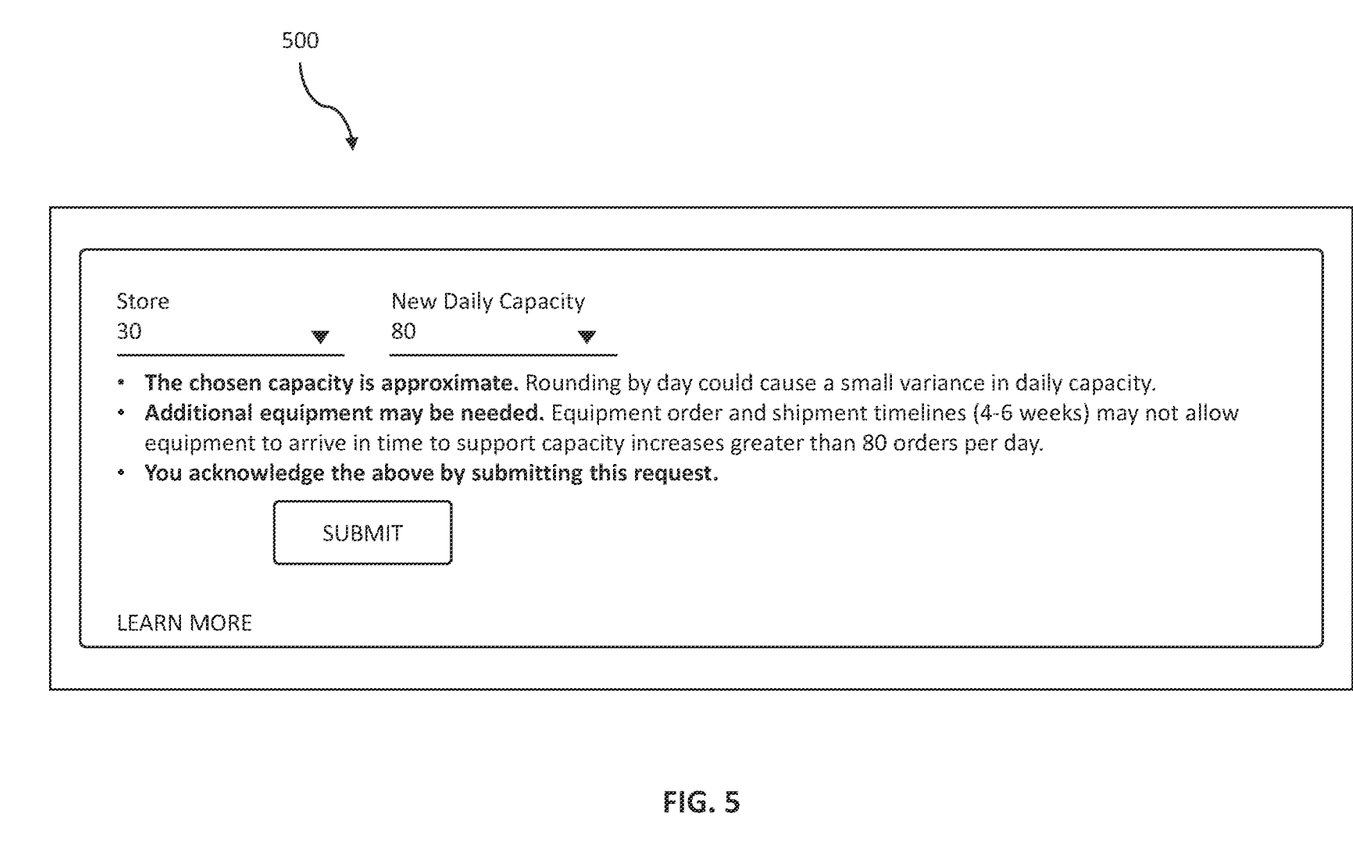
FIG. 5 illustrates a request interface to request a new daily capacity for a store according to an exemplary embodiment.

FIG. 5 illustrates a request interface 500 to request a new daily capacity for a store, in accordance with an exemplary embodiment. Interface 500 may be a user interface, e.g., rendered by a website hosted by a server accessed by an application, which can be a web browser.

Figure 6:
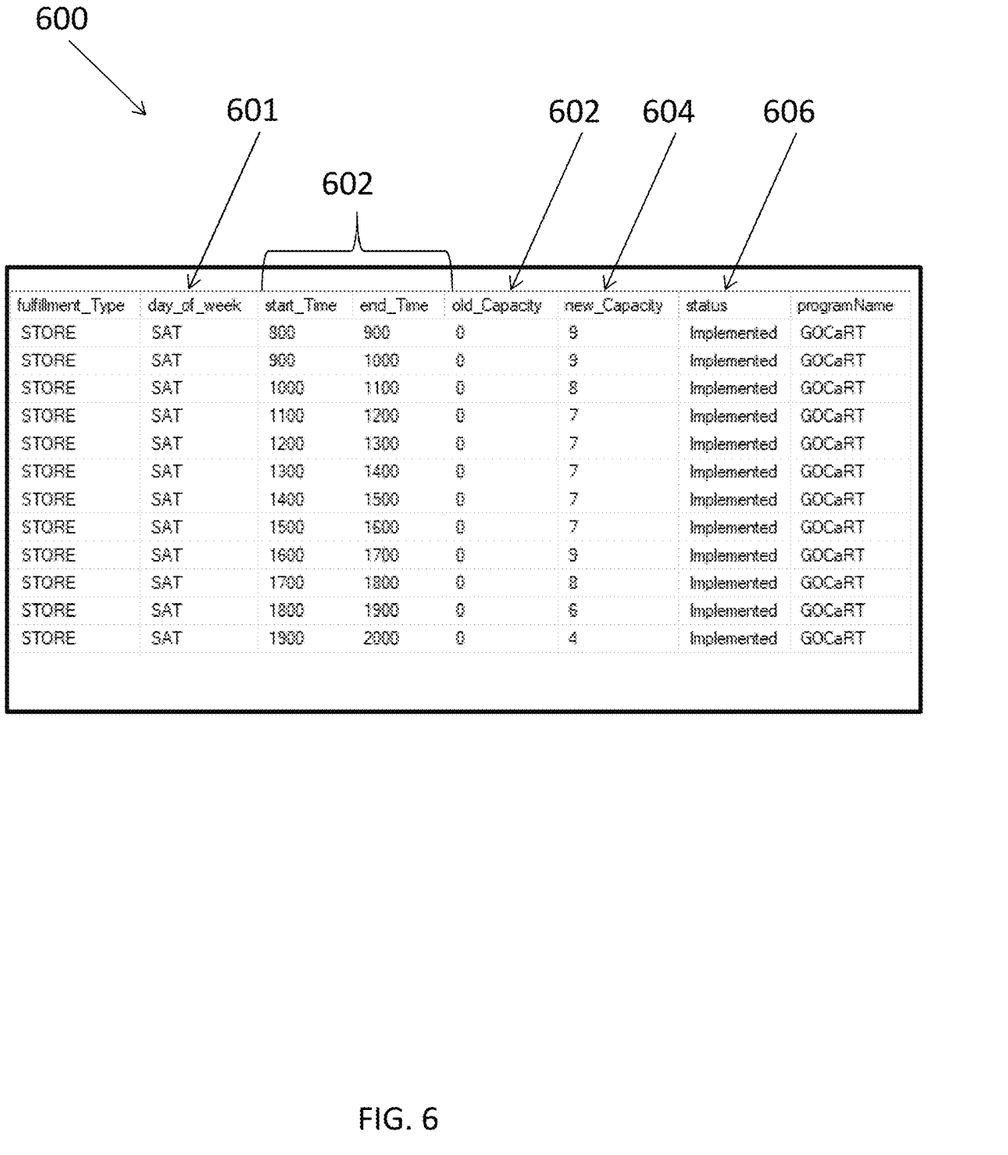
FIG. 6 illustrates a data results interface according to an exemplary embodiment.

FIG. 6 illustrates a data results interface 600, in accordance with an exemplary embodiment. Interface 600 shows a store's hourly distribution (601) of slots for a predefined day (here Saturday 601) based on a request for ~90 slots a day. Each day of the week will be different based on expected demand. Interface 600 displays an old capacity 602, a new capacity 604, and a status of the new capacity 606 (i.e., implemented or not implemented). Interface 600 may be a user interface, e.g., rendered by a website hosted by a server accessed by an application, which can be a web browser.

The description is presented to enable a person skilled in the art to create and use a computer system configuration and related method and systems for modifying capacity for a new retail facility. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A system for modifying retail facility order-processing capacity, the system comprising:
   one or more computer-readable media storing an application;
   a first computing device including a control circuit with a programmable processor configured to execute the application and including a visual display and an order-processing capacity modification module, wherein the order-processing capacity modification module, when executed:
   generates a graphical user interface on the visual display of the first computing device, the graphical user interface including at least one input field configured to permit a user of the first computing device to:
   select a retail facility for an order-processing capacity modification;
   view a current order-processing capacity for each hour of a work day of the retail facility selected for the order-processing capacity modification, wherein the order-processing capacity represents a maximum number of orders projected to be processed at the retail facility within each hour of the work day;

input a new order-processing capacity for one or more hours of the work day of the retail facility, wherein the new order-processing capacity is different from the current order-processing capacity and modifies the maximum number of orders projected to be processed at the retail facility within the one or more hours of the work day, for each of the one or more hours of the work day, view status information indicating whether the new order-processing capacity is implemented or not; and submit a request for the new order-processing capacity for the retail facility over a network to a server remote to the first computing device, wherein the server is configured to obtain electronic information associated with the retail facility over the network from a database to determine whether a prior order-processing capacity request for the retail facility is stored in the database, and wherein in response to a determination by the processor of the control circuit of the server that the prior order-processing capacity request for the retail facility is stored in the database, the control circuit of the server is configured to:

transmit an electronic notification over the network to the first computing device to generate a prompt within the graphical user interface on the visual display of the first computing device, the prompt requiring the user of the first computing device to:

confirm an override of the prior order-processing capacity request stored in the database, and approve the request for the new order-processing capacity for the retail facility;

in response to a determination by the control circuit of the server that the new order-processing capacity approved by the user via the graphical user interface on the first computing device exceeds a specified threshold number of customer orders placed with the retail facility, transmit an electronic communication to an electronic device of a deployment team member, in response to a determination by the control circuit of the server that the new order-processing capacity approved by the user via the graphical user interface on the first computing device does not exceed the specified threshold number of customer orders placed with the retail facility, transmit an electronic communication to the electronic device of an implementation team member, and forward the new order-processing capacity to a capacity scheduling tool to produce a revised order-processing capacity schedule based on the request for the new order-processing capacity approved by the user, wherein the database is updated to reflect the revised order-processing capacity schedule; and a second computing device configured to interface over the network with a webserver hosting a website to render the revised order-processing capacity schedule in the website.

2. The system of claim 1, wherein the retail facility is a new retail facility.

3. The system of claim 2, wherein the new retail facility is a retail facility which is less than 30 days from opening.

4. The system of claim 2, wherein the new retail facility is a retail facility which has been open less than 14 days.

5. The system of claim 1, wherein the control circuit of the server is configured to verify whether there is sufficient equipment available at the retail facility to handle the requested order-processing capacity increase after the user submits the order-processing capacity increase request.

6. The system of claim 1, wherein the control circuit of the server is configured to verify whether the retail facility will be open a sufficient number of hours to handle the requested order-processing capacity increase after the user submits the order-processing capacity increase request.

7. The system of claim 1, wherein the revised order-processing capacity schedule is used for handling online grocery orders.

8. A computer-implemented method for modifying order-processing capacity of a retail facility, the method comprising:

providing a computing device including a control circuit with a programmable processor configured to execute an application and including a visual display and order-processing capacity modification module;

generating, by the order-processing capacity modification module, a graphical user interface on the visual display of the computing device, the graphical user interface including at least one input field configured to permit a user of the computing device to:

select a retail facility for an order-processing capacity modification;

view a current order-processing capacity for each hour of a work day of the retail facility selected for the order-processing capacity modification, wherein the order-processing capacity represents a maximum number of orders projected to be processed at the retail facility within each hour of the work day;

input a new order-processing capacity for one or more hours of the work day of the retail facility, wherein the new order-processing capacity is different from the current order-processing capacity and modifies the maximum number of orders projected to be processed at the retail facility within the one or more hours of the work day, for each of the one or more hours of the work day, view status information indicating whether the new order-processing capacity is implemented or not; and submit a request for the new order-processing capacity for the retail facility over a network to a server remote to the first computing device, obtaining, by the server and over the network, electronic information associated with the retail facility from a database to determine whether a prior order-processing capacity request for the retail facility is stored in the database;

in response to a determination by the processor of the control circuit of the server that the prior order-processing capacity request for the retail facility is stored in the database:

transmitting an electronic notification from the server over the network to the computing device generate a prompt within the graphical user interface on the visual display of the first computing device, the prompt requiring the user of the first computing device to:

confirm an override of the prior order-processing capacity request stored in the database, and approve the request for the new order-processing capacity for the retail facility;

in response to determining by the control circuit of the server that the new order-processing capacity approved by the user via the graphical user interface on the first computing device exceeds a specified threshold number of customer orders placed with the retail facility, transmitting from the server an electronic communication to an electronic device of a deployment team member, in response to a determination by the control circuit of the server that the new order-processing capacity approved by the user via the graphical user interface on the first computing device does not exceed the specified threshold number of customer orders placed with the retail facility, transmitting from the server an electronic communication to the electronic device of an implementation team member, and forwarding by the server of the new order-processing capacity to a capacity scheduling tool to produce a revised order-processing capacity schedule based on the request for the new order-processing capacity approved by the user and to update the database to reflect the revised order-processing capacity schedule; and interfacing, via the computing device, with a webserver hosting a website to render on the visual display of the computing device, the revised order-processing capacity schedule in the website.

9. The computer-implemented method of claim 8 wherein selection of a retail facility for the order-processing capacity modification comprises selection of a new retail facility by a user.

10. The computer-implemented method of claim 9, wherein the new retail facility is a retail facility which is less than 30 days from opening.

11. The computer-implemented method of claim 9, wherein the new retail facility is a retail facility which has been open less than 14 days.

12. The computer-implemented method of claim 8, further comprising verifying, by the control circuit of the computing device, whether there is sufficient equipment available at the retail facility to handle the requested order-processing capacity increase after the user submits the order-processing capacity increase request.

13. The computer-implemented method of claim 8, further comprising verifying, by the control circuit of the computing device, whether the retail facility will be open a sufficient number of hours to handle the requested order processing capacity increase after the user submits the order processing capacity increase request.

14. The computer-implemented method of claim 8, wherein the revised order processing capacity schedule is used for handling online grocery orders.

15. A non-transitory machine-readable medium storing instructions executable by a computing device, wherein execution of the instructions causes the computing device to implement a method for modifying order-processing capacity of a retail facility, the method comprising:

providing a computing device including a control circuit with a programmable processor configured to execute an application and including a visual display and an order processing capacity modification module;

generating, by the order-processing capacity modification module, a graphical user interface on the visual display of the computing device, the graphical user interface including at least one input field configured to permit a user of the computing device to:

select a retail facility for an order-processing capacity modification;

view a current order-processing capacity for each hour of a work day of the retail facility selected for the order-processing capacity modification, wherein the order-processing capacity represents a maximum number of orders projected to be processed at the retail facility within each hour of the work day;

input a new order-processing capacity for one or more hours of the work day of the retail facility, wherein the new order-processing capacity is different from the current order-processing capacity and modifies the maximum number of orders projected to be processed at the retail facility within the one or more hours of the work day, for each of the one or more hours of the work day, view status information indicating whether the new order-processing capacity is implemented or not; and submit a request for the new order-processing capacity for the retail facility over a network to a server remote to the first computing device, obtaining, by the server and over the network, electronic information associated with the retail facility from a database to determine whether a prior order-processing capacity request for the retail facility is stored in the database;

in response to a determination by the processor of the control circuit of the server that the prior order-processing capacity request for the retail facility is stored in the database:

transmitting an electronic notification from the server over the network to the computing device generate a prompt within the graphical user interface on the visual display of the first computing device, the prompt requiring the user of the first computing device to:

confirm an override of the prior order-processing capacity request stored in the database, and approve the request for the new order-processing capacity for the retail facility;

in response to determining by the control circuit of the server that the new order-processing capacity approved by the user via the graphical user interface on the first computing device exceeds a specified threshold number of customer orders placed with the retail facility, transmitting from the server an electronic communication to an electronic device of a deployment team member, in response to a determination by the control circuit of the server that the new order-processing capacity approved by the user via the graphical user interface on the first computing device does not exceed the specified threshold number of customer orders placed with the retail facility, transmitting from the server an electronic communication to the electronic device of an implementation team member, and forwarding by the server of the new order-processing capacity to a capacity scheduling tool to produce a revised order-processing capacity schedule based on the request for the new order-processing capacity approved by the user and to update the database to reflect the revised order-processing capacity schedule; and interfacing, via the computing device, with a webserver hosting a website to render on the visual display of the computing device, the revised order-processing capacity schedule in the website.

16. The non-transitory machine-readable medium of claim 15, wherein the instructions enabling a user to select a retail facility for having the order-processing capacity modification comprises instructions enabling a user to select a new retail facility for having the order-processing capacity modification.

17. The non-transitory machine-readable medium of claim 16, wherein the new retail facility is a retail facility which is less than 30 days from opening.

18. The non-transitory machine-readable medium of claim 16, wherein the new retail facility is a retail facility which has been open less than 14 days.

19. The non-transitory machine-readable medium of claim 15, further comprising verifying, by the control circuit of the computing device, whether there is sufficient equipment available at the retail facility to handle the requested order-processing capacity increase after the user submits the order-processing capacity increase request.

20. The non-transitory machine-readable medium of claim 15, further comprising verifying, by the control circuit of the computing device, whether the retail facility will be open a sufficient number of hours to handle the requested order-processing capacity increase after the user submits the order-processing capacity increase request.

* * * * *